United States Patent
Destree

(10) Patent No.: US 7,419,543 B2
(45) Date of Patent: Sep. 2, 2008

(54) METAL FIBER CONCRETE

(75) Inventor: Xavier Destree, La Hulpe (BE)

(73) Assignee: Trefilabed Bissen S.A., Bissen (LU)

( * ) Notice: Subject to any disclaimer, the term of this patent is extended or adjusted under 35 U.S.C. 154(b) by 63 days.

(21) Appl. No.: 10/582,757

(22) PCT Filed: Dec. 10, 2004

(86) PCT No.: PCT/EP2004/053399

§ 371 (c)(1), (2), (4) Date: Jun. 13, 2006

(87) PCT Pub. No.: WO2005/068388

PCT Pub. Date: Jul. 28, 2005

(65) Prior Publication Data

US 2007/0289502 A1 Dec. 20, 2007

(30) Foreign Application Priority Data

Dec. 16, 2003 (EP) .................. 03104736

(51) Int. Cl.
C04B 14/48 (2006.01)
C04B 28/02 (2006.01)
E04C 5/01 (2006.01)

(52) U.S. Cl. ................. 106/640; 106/641; 106/643; 106/644; 264/333

(58) Field of Classification Search .......... 106/640, 106/641, 644, 643; 264/333
See application file for complete search history.

(56) References Cited

U.S. PATENT DOCUMENTS 3,808,085 A * 4/1974 Givens, Jr. ............... 52/340
4,121,943 A * 10/1978 Akazawa et al. ............ 106/644
4,159,911 A * 7/1979 Takazuka ................. 106/644
4,366,255 A * 12/1982 Lankard ................... 501/95.1
4,585,487 A * 4/1986 Destree et al. ............. 106/644
5,451,471 A * 9/1995 Over et al. ................ 428/574
6,045,910 A * 4/2000 Lambrechts ............... 428/399
6,235,108 B1 * 5/2001 Lambrechts ............... 106/644
6,478,867 B1 * 11/2002 Cheyrezy et al. ........... 106/644
6,887,309 B2 * 5/2005 Casanova et al. ........... 106/644
7,267,873 B2 * 9/2007 Pilakoutas et al. .......... 428/379
2004/0050302 A1 * 3/2004 Casanova et al. ........... 106/640

FOREIGN PATENT DOCUMENTS

| GB | 2047315 A | * | 11/1980 |
| GB | 2412402 A | * | 9/2005 |
| JP | 2000281402 A | * | 10/2000 |
| JP | 2002249350 A | * | 9/2002 |
| WO | WO-98/27022 A1 | * | 6/1998 |
| WO | 02/18291 A1 | | 3/2002 |

OTHER PUBLICATIONS

"Product Data Sheet—Dramix RL-45/50-BN", retrieved on May 10, 2004, Online: http://www.bekaert.com/BUILDING.
Destree, X., "Twincone SFRC Structural Concrete", *Fiber Reinforced Concrete, Modern Developments*, pp. 77-86, (1995). (no month).

* cited by examiner

*Primary Examiner*—Anthony J Green
(74) *Attorney, Agent, or Firm*—The Nath Law Group; Jerald L. Meyer; Matthew J. Moffa

(57) ABSTRACT

A mixture of metal fiber concrete based on cement, granular elements and water, comprising metal fibers whose diameter ranges from 1.15 mm to 1.8 mm, wherein the form coefficient thereof is between 35 and 45. The dosing of metal fibers is at least 80 kg/m$^3$. This concrete mixture is particularly adapted to the creation of structural elements such as floor slabs without traditional reinforcements.

17 Claims, 2 Drawing Sheets

METAL FIBER CONCRETE

INTRODUCTION

The present invention relates to a metal fiber concrete mix for the manufacture of concrete elements, especially for structural applications.

PRIOR ART

The constituents of concrete are very brittle when subjected to tensile stresses and impact loads, and it has always been necessary to reinforce the concrete in order to take account of this lack of ductility. In many cases, the concrete element is kept intact by means of a reinforcement consisting of ribbed rebars or steel mesh. In some applications, fibers are also employed, generally to complement the conventional reinforcement.

In practice, the necessary recourse to such reinforcements is somewhat constraining, especially in constructions in which the concrete elements are poured on site into formwork. For example when producing floor slabs in a building, the operations of shaping and positioning the steel rebars or mesh in the formwork are complex and require, in the planning stage for each storey of the building, a considerable amount of time.

To be able to dispense with conventional reinforcement in the construction of flooring, it has been proposed to produce slabs that are reinforced only with metal fibers.

One technique of this kind is commonly used for the construction of industrial slabs on poor ground, requiring, in order to benefit from a stable foundation, the slabs to rest on a grid of piles sunk down to several meters in depth into more stable ground. According to this technique, the flooring, reinforced with only steel fiber, is laid on piles spaced apart with a distance ranging from 2.40 to 6 m depending on the case, for thicknesses ranging from 20-25 cm to 30-40 cm respectively, the slabs therefore being characterized by a slenderness (area/thickness) ratio of between 15 and 20.

Such flooring has for example been produced with what are called TWINCONE fibers (i.e. straight fibers with conical ends), as described in the article "*Twincone SFRC structural concrete*" by Xavier Destrée (cf. Fiber Reinforced Concrete, Modern Developments, Editors: N. Banthia, S Mindess, University of British Columbia, Vancouver, B.C., Canada, March 1995, pp. 77-86), for a slab of 5.66 m by 6 m in area and 35 cm in thickness, i.e. a slenderness of 600/35=17, with an over-thickness of 15 cm by 1 m×1 m above each pile, using a concrete reinforced with 45 kg/m$^3$ of TWINCONE steel fiber.

Another example of such flooring is given in the article entitled "Structural Application Of Steel Fiber As Principal Reinforcing: Conditions-Design-Examples" by Xavier Destrée (cf. RILEM Proceedings PRO 15, of the Fifth International Rilem Symposium, Fiber-reinforced Concretes (FRC), BEFIB 2000, Lyons, France, Sep. 13-15, 2000, editors: P. Rossi and G. Chanvillard, pp. 291-301). This describes a construction of a floor with an area of 3.60 m×3.60 m with a thickness of 25 cm, hence a slenderness of 360/25=14.4, reinforced with 45 kg/m$^3$ of steel fiber. For this application, steel fibers with a length of between 54 mm and 60 mm and a diameter of 1 mm were used in weight contents of between 40 and 50 kg/m$^3$ depending on the case.

These examples of the construction of structural elements made of concrete reinforced only with metal fiber are quite limited and relate to slenderness (area/thickness) ratios of between 15 and 20. Furthermore, the fiber dosages being used are, in practice, the maximum possible under the work site conditions with an optimum concrete formulation that still makes it possible to obtain a workability compatible with the techniques of mixing, transporting and laying concrete on the work site.

Although this technique of laying slabs on piles is advantageous for the construction of industrial flooring, it cannot be transposed to the construction of floor slabs in dwellings for example, where higher slenderness ratios, of around 25 to 35, are required.

To reinforce floor slabs of 25 to 35 slenderness, it would therefore be necessary to increase the efficiency of the reinforcement obtained by the steel fibers. According to the extensive scientific literature on steel fiber reinforced concrete, it appears that one important factor is the increase in aspect ratio (length/diameter) of the fibers (cf. Perumalsamy N. Balaguru, Surendrah P. Shah in "*Fiber Reinforced Cement Composites*", 1992, McGraw-Hill, p. 55, chapter 3), thus making it possible to increase the performance. Consequently, according to the usual practice, it would be necessary to increase the aspect ratio by reducing the diameter of the fibers and increasing their length, and it would also be possible to improve their anchoring or even to increase the weight content of steel fiber.

In the known applications described above of structural slabs with steel fiber as sole reinforcement, it is not possible, in practice, to increase the aspect ratio and the content (dosage) without making the concrete unusable under work site conditions owing to lack of workability and imperfect mixing of the fibers.

Other trials (cf. "*Bending Test and Interpretation*" by Lucie Vandewalle and David Dupont, RILEM Proceedings PRO31 "Test and Design Methods for Steel Fibre Reinforced Concrete-Background and Experiences", 2003, edited by B. Schnütgen and L. Vandewalle, pp. 1-13) have shown that among fiber concretes of highest performance, of the C25/30 type with 75 kg/m$^3$ of fiber with a diameter of 0.9 mm and a length of 60 mm (L/d=65), according to P-Cmod (Crack Mouth Opening Displacement) bending tests, provide only a 30% increase in ultimate tensile strength relating to crack resistance.

This rather limited strength enhancement, despite the substantial increase in fiber content and in the aspect ratio, does not meet the design requirements for a floor slab with a slenderness of between 25 and 35.

This is because, in a floor slab, the bending stress resulting from bending moments is proportional to $(l/h)^2$, i.e. the ratio of the span to the thickness, and it would therefore be necessary to more than double the bending strength in order to allow a slenderness ratio of between 25 and 35. Thus, conventional fiber concretes have not hitherto allowed structural elements with such a slenderness to be produced.

To summarize, the use of metal fiber concretes for the construction of structural elements remains very limited since it is generally considered that the fibers are unable to constitute an alternative to the conventional reinforcement, but merely play a complementary reinforcement role. Consequently, according to the general practice, the conventional reinforcement with steel rebars has to be put into place so as to withstand the tensile, shear and compressive loads, whereas the role of fibers consists in improving the strength of the matrix. In these conventional metal fiber concretes, the fiber dosage is typically around 30 to 50 kg/m$^3$ and fibers having an aspect ratio of between 50 and 100 are employed.

One exception to conventional fiber concretes consists of ultra-high-performance ductile concrete (UHPC), as described in WO 95/01316. This is a high-tech concrete of special behavior, which is prepared from a mix comprising aggregates at most 800 μm in size and metal fibers between 4 and 20 mm in length. The ratio of the mean fiber length to the maximum dimension of the aggregates is at least 10 and the volume of metal fibers is preferably around 2.5% of the volume of the concrete after setting, i.e. about 200 kg/m$^3$. This mix allows concrete elements to be manufactured without conventional metal reinforcement. It should be noted that the UHPC is not comparable to conventional concrete as it does not contain conventional aggregates (all its mineral components have a size of less than a few millimeters) but contains small fibers in a much higher proportion than normal. UHPC has already been used in a number of reference applications, but it will be understood that UHPC remains a high-tech concrete, which means that it has a high manufacturing cost and therefore is unsuitable for standard use in conventional constructions.

It is therefore apparent that, apart from the case of UHPC, metal fiber concretes without passive reinforcement are little used and in particular do not allow the construction of structural elements of the floor-slab type with a slenderness of greater than 20.

It would be good to have a metal fiber concrete mix that is easy to work, is inexpensive and allows the manufacture of flat elements with a high slenderness, suitable for structural applications, and without any conventional reinforcement.

General Description of the Claimed Invention With its Main Advantages

According to the invention, a metal fiber concrete mix based on cement, aggregates and water includes metal fibers having a diameter of between 1.15 mm and 1.8 mm and an aspect ratio of between 35 and 45. The quantity of these metal fibers in the mix is such that the weight of fiber is at least 80 kg/m$^3$ of hardened concrete. The quantity of metal fiber is given here relative to the volume of hardened concrete (after setting), as is customary for concrete.

The term "aspect ratio" denotes the length-to-diameter ratio of the fiber. If the fiber does not have a generally cylindrical shape, a diameter corresponding to that of a cylinder of equivalent cross section may be used. In addition, if the fiber is not straight, distance separating the ends may be used as length.

The concrete mix according to the invention is prepared by mixing and blending the solid constituents with water, in a manner known per se. Such a mix, after mixing, pouring and hardening in a mold or formwork, produces a solid body made of metal fiber concrete.

The subject of the present invention is therefore also a metal fiber concrete comprising a cementitious matrix substance that includes metal fibers, which substance is obtained by hardening of a cement-based hydraulic mix and water, in which the metal fibers have a diameter of at least 1.15 mm, and with a maximum of 1.8 mm, an aspect ratio of between 35 and 45 and a dosage of at least 80 kg/m$^3$ of concrete.

It will be appreciated that the concrete mix according to the invention allows the construction of a metal fiber concrete element with a slenderness ratio of greater than 20, and especially around 25 to 35, which has good reinforcement in bending and in shear, and therefore can be used in structural applications.

Thus, the concrete mix according to the invention allows the construction of concrete elements for structural use with a high slenderness, and to do so without any conventional reinforcement. The present invention, which therefore proposes a reinforcement only by metal fibers, instead of using them as a complement to metal rebars or mesh, furthermore uses fibers of unusual dimensions. This is because, surprisingly and contrary to conventional practice, the performance of the concrete according to the invention is achieved with metal fibers having a low aspect ratio and larger diameter than is usual. Furthermore, the fibers are added in substantially larger quantity than in the customary practice.

It will also be appreciated that the concrete mix according to the invention makes it possible to produce a ready-mixed reinforced concrete of high workability and good pumpability, and it is therefore compatible with on-site concrete mixing, transporting and laying techniques.

Although it is generally considered that conventional unreinforced fiber concrete cannot be used as structural concrete, that is to say for the manufacture of beams, posts, columns or slabs, the concrete according to the invention constitutes, on the contrary, a material that is particularly well suited for such applications. It should also be noted that, thanks to its improved behavior, the concrete according to the invention is particularly suitable for flat structural elements, such as floor slabs in which the slenderness ratio may range up to 35. The concrete mix according to the invention may therefore be advantageously used for the construction of floor slabs cast on site in formwork, thus eliminating the need for conventional reinforcement, and substantially simplifying the production of many constructions.

By proposing a mix allowing the construction of such concrete elements, the present invention overcomes the technical prejudice that a fiber-only reinforcement is insufficient for structural applications. Furthermore, the dimensions of metal fibers and their dosage, which are selected for producing the concrete mix according to the invention, go counter to the usual considerations, which recommend an increase in aspect ratio in order to make the reinforcement more effective. Finally, the dimensions of the metal fibers in the mix according to the invention make it possible to work with high dosages, without compromising the workability of the mix.

In practice, elimination of the steel rebars and metal mesh substantially simplifies the construction of concrete elements. This may be particularly appreciated in the construction of elements from concrete poured on site into formwork, as the work site conditions may be difficult, but also of prefabricated elements.

Preferably, the metal fibers have an aspect ratio of around 40 and their length is between 45 and 65 mm. The content of metal fiber is such that it preferably represents between 80 and 180 kg/m$^3$ of hardened concrete. A concrete mix based on these preferred values makes it possible in particular to guarantee good workability and pumpability of the mix. This allows the mix according to the invention to be easily used, in the manner of a ready mixed concrete.

It will be preferable to use metal fibers manufactured from steel wire, obtained for example by wire-drawing or by rolling. Although straight, smooth wire-drawn steel fibers are preferred, it is possible to use a variety of metal fibers of different shape and surface roughness, provided that they have an aspect ratio and a minimum diameter that are in accordance with the invention. For example, corrugated or ribbed fibers, or fibers with hooks or flattened ends, or having a combination of these anchoring means, may be employed.

Apart from the metal fibers, the other components of the concrete are preferably those of conventional concretes. Typically, the cement has a grain size of between 1 and 100 μm and the aggregates comprise fine and coarse elements, such as for example sand having a grain size of between 1 and 5 mm, and aggregates with a size of between 5 and 25 mm (of which the aggregates with a size of 5/15 mm preferably constitute two thirds of the weight of the coarse elements).

Furthermore, the mix according to the invention may include a number of conventional admixtures, such as plasticizers, superplasticizers, hardening accelerators, set retarders, air entrainers, etc.

The concrete mix according to the invention is suitable, apart from the particular example of floor slabs, for the production of a variety of concrete elements, whether structural or decorative. However, the invention proves to be particularly advantageous for the construction of structural elements, since the use of conventional reinforcements is no longer necessary. It should therefore be noted that the mix according to the invention can be used for the construction of concrete elements of the following type: floor slab, shell, retaining wall, foundation slab, beam or column.

Another example of the application of a concrete according to the invention relates to main foundation rafts, which are formed from a general-purpose slab on which columns or shells are erected from the level of the finished foundation. The raft is constructed under the entire area occupied by the building, and therefore over its entire length and width. The thickness of the raft essentially depends also on the nature of the ground and on the overload occasioned by the building. In general, the thickness for standard buildings is between 300 mm and 1000 mm. Such a raft may be constructed by means of a concrete mix according to the invention, in which the fiber-reinforced concrete completely replaces the conventional reinforced concrete.

BRIEF DESCRIPTION OF THE DRAWINGS

Other particular aspects and features of the invention will become apparent from the detailed description of a few advantageous embodiments presented below by way of illustration, with reference to the appended drawings. These show.

A few exemplary embodiments of slabs manufactured with a concrete according to the invention will be described in greater detail below.

These slabs were obtained from preferred embodiments of the present concrete mix, and are based on cement, fine and coarse aggregates and water, and they include metal fibers that have a diameter in the 1.15 mm to 1.8 mm range, an aspect ratio between 35 and 45, and that are added to a dosage rate of at least 80 kg/m$^3$ of hardened concrete.

A concrete element obtained with a mix according to the invention has a high crack resistance for slenderness ratios of up to 35 and advantageously can be used as a floor slab, shell, retaining wall, beam, column, foundation slab or raft, or for any structural or decorative element.

EXAMPLE 1

Two types of mix (mix 1 and mix 2) according to the invention were produced for making circular slabs of 1.50 m diameter and 15 cm thickness on the one hand (type A), and 2.00 m diameter and 20 cm thickness on the other (type B).

The proportions for these two mixes are given in Table 1 below:

TABLE 1

| | Mix 1 | Mix 2 |
|---|---|---|
| Cement content | 360 kg/m$^3$ | 360 kg/m$^3$ |
| Aggregates (from 0 to 15 mm) | 1800 kg/m$^3$ | 1800 kg/m$^3$ |
| Water/cement ratio | 0.50 | 0.50 |
| Superplasticizer | 1% of the quantity of cement | 1% of the quantity of cement |
| Steel fibers (corrugated steel wire of 850 N/mm$^2$ tensile strength): | | |
| dosage: | 120 kg/m$^3$ | 100 kg/m$^3$ |
| diameter: | 1.15 mm | 1.3 mm |
| length: | 45 mm | 50 mm |

It will be noted that these formulations are relatively conventional in respect of the usual constituents of concrete, that is to say cement, aggregates and water. The mixes obtained had a fluidity allowing the concrete to be laid and pumped without any difficulty.

Figure 1:
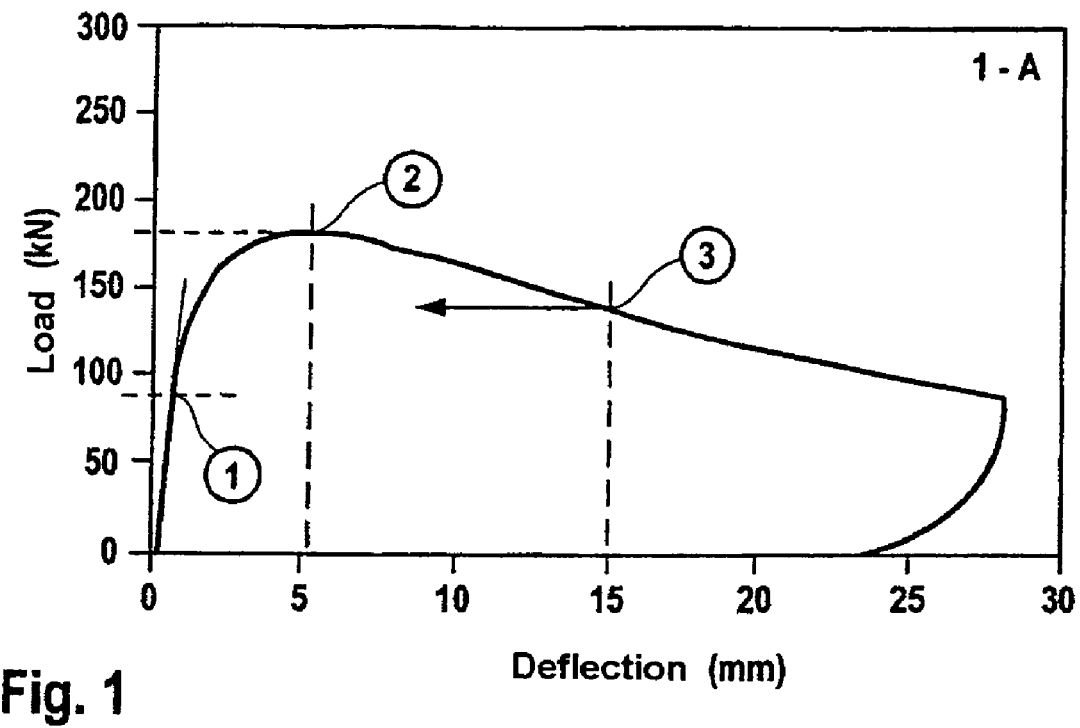
FIG. 1: a load-deflection plot for a circular slab (A) of 1.50 m diameter manufactured with mix 1.
Figure 2:
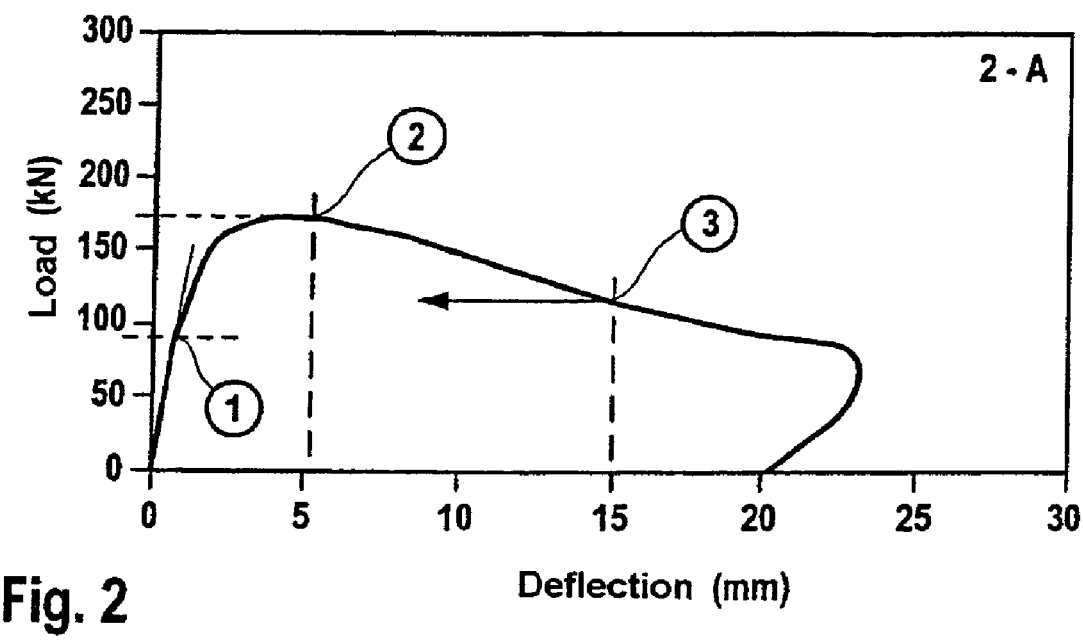
FIG. 2: a load-deflection plot for a circular slab (A) of 1.50 m diameter manufactured with mix 2.
Figure 3:
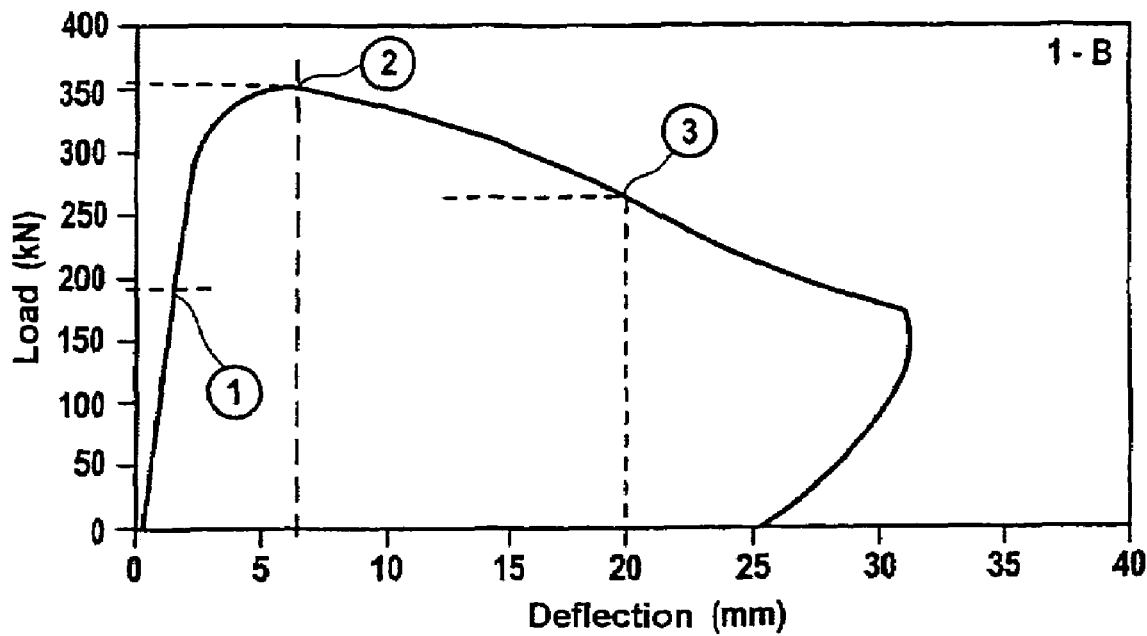
FIG. 3: a load-deflection plot for a circular slab (B) of 2.00 m diameter manufactured with mix 1.
Figure 4:
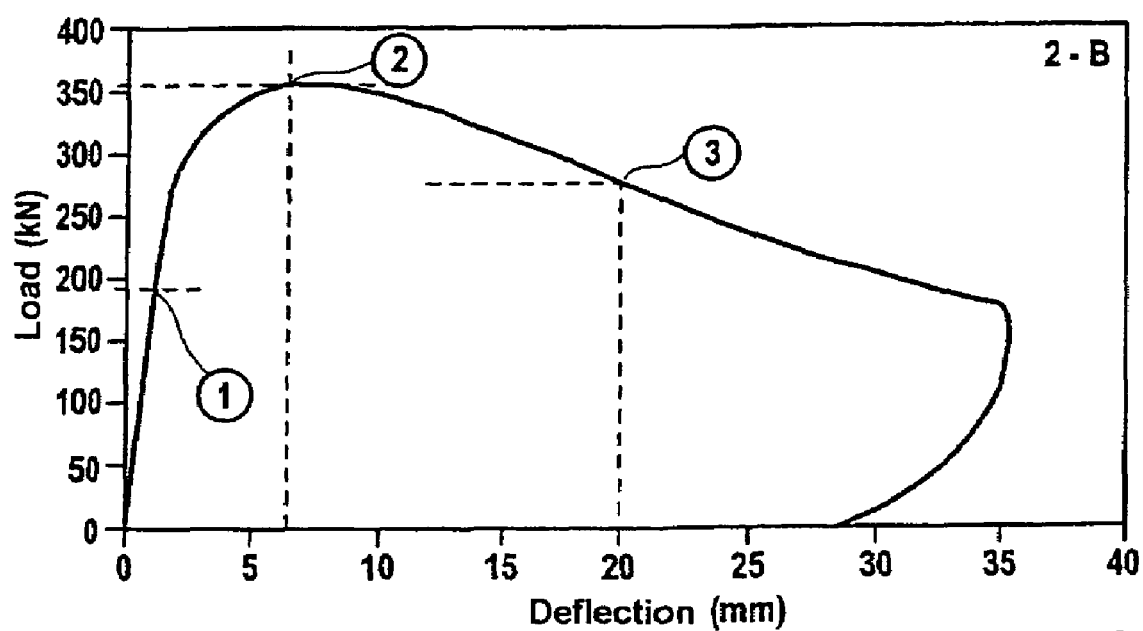
FIG. 4: a load-deflection plot for a circular slab (B) of 2.00 m diameter manufactured with mix 2.

The circular slabs obtained from these two mixes were subjected to bending tests. These slabs were supported around their edge and subjected to a central point load, with the deflection at the center of the slabs being recorded. The test results are illustrated in FIGS. 1 to 4, in which the circled numbers 1, 2 and 3 indicate, respectively, the cracking load, the maximum recorded load and the residual load for a deflection of 15 mm and 20 mm, respectively.

The bending tests on the circular slabs show that first-cracking point loads of 90 kN in the case of the 1.50 m diameter with mixes 1 and 2 (see FIGS. 1 and 2) and 180 kN for the 2.00 m diameter with mixes 1 and 2 (see FIGS. 3 and 4) are obtained.

Point loads of fracture of 180 kN and 350 kN respectively are also obtained.

For measured deflections of greater than 15 and 20 mm, of the 1.50 m diameter slab and 2.00 m diameter slab, respectively, the residual point load still substantially exceeded the first-crack load.

We also point out that the perimeter face of the slabs after the end of the test had, in all cases, between 15 and 30 radial cracks and finally that, in all cases, no puncturing of these slabs was observed.

The above observations show that the above slabs behave in a stable and controlled manner, well beyond the elastic limits, exceeding these by more than 100%, and therefore not by only 30% as in the prior fiber reinforcement technique described in the article "Bending Test and Interpretation" by Lucie Vandewalle and David Dupont (see above).

A concrete mix of type 1 or 2 is suitable for example for the construction of a typical storey floor slab, 20 cm in thickness and supported by columns of 25 cm×25 cm cross section spaced apart by 6 m in both the x and y directions. This floor supports a service load of at least 7 kN/m$^2$.

EXAMPLE 2

Another example of concrete according to the invention was used to construct a floor slab 20 cm in thickness, supported by columns of 25 cm×25 cm cross section and spaced apart by 7 m along x and y. This floor was subjected to a distributed load of 10 kN/m$^2$.

In this case, the concrete again had the same formulation as in the previous case (example 1) but was reinforced by means of 150 kg/m$^3$ of corrugated steel fiber 1.6 mm in diameter and 60 mm in length.

EXAMPLE 3

A third example relates to a foundation raft installed beneath an office building or block of apartments, comprising 11 levels in total, the columns or shells being spaced apart by 6 m and the raft being laid on a ground withstanding a service pressure of 0.1 N/mm². The overload on the columns in this case reached 3500 kN. A 600 mm thick raft was provided.

The proportions of the mix were the following:
cement: 350 kg/m³;
aggregate: 0/4 mm sand: 800 kg/m³
    4/14 mm crushed stone: 800 kg/m³;
    7/20 mm crushed stone: 250 kg/m³;
water: 175 kg/m³;
superplasticizer: 5 kg/m³;
steel fiber: diameter: 1.3 mm; length: 50 mm; 800 N/mm² constituent wire, corrugated type; dosage: 100 kg/m³.

To ensure good pumping conditions, this formulation preferably included at least 450 kg/m³ of fines with a screen undersize of 200 μm, including the cement. When required, the lack of fines could be compensated for by the addition of a suitable filler.

EXAMPLE 4

Another concrete mix according to the invention is proposed below:

Cement: 350 kg/m³, and the rest as in Example 3, but reinforced with steel fiber 1.5 mm in diameter and 60 mm in length, of corrugated shape or with flattened ends, mixed with a content of 140 kg/m³, allowing the construction of a storey floor having:
columns of 300×300 mm section;
span between the columns: 7 m;
slab thickness: 220 mm; and
operational overload: 8 kN/m².

The invention claimed is:

1. A metal fiber concrete mix based on cement, aggregates and water, which includes metal fibers having:
    a diameter of between 1.15 mm and 1.8 mm;
    an aspect ratio of between 35 and 45; and
    in which the quantity of these metal fibers is such that their weight is at least 80 kg/m³ of hardened concrete.

2. The concrete mix as claimed in claim 1, in which the metal fibers have an aspect ratio of around 40.

3. The concrete mix as claimed in claim 1, in which the metal fibers have a length of between 45 and 65 mm.

4. The concrete mix as claimed in claim 1, in which the dosage of metal fiber is between 80 and 180 kg/m³.

5. The concrete mix as claimed in claim 1, in which the cement has a grain size of between 1 and 100 μm.

6. The concrete mix as claimed in claim 1, in which the aggregates comprise sand having a grain size of between 1 and 5 mm.

7. The concrete mix as claimed in claim 1, in which the aggregates comprise coarse elements with a size of between 5 and 25 mm.

8. The concrete mix as claimed in claim 1, in which the metal fibers are steel wire fibers.

9. The concrete mix as claimed in claim 1, in which the metal fibers have a straight, corrugated, ribbed or hooked shape, or a combination of two or more of the straight, corrugated, ribbed, and hooked shapes.

10. A metal fiber concrete element obtained by pouring and hardening a concrete mix as claimed in claim 1.

11. The concrete element as claimed in claim 10, which is obtained by pouring into a formwork or mold.

12. The concrete element as claimed in claim 10, said element having a slenderness ratio of up to 35, but containing no reinforcing bars.

13. The concrete element as claimed in claim 10, wherein the concrete element is a structural or decorative element used in a construction.

14. The concrete element as claimed in claim 13, wherein the structural or decorative element is a floor slab, shell, retaining wall, beam, column, foundation slab or raft.

15. A structural concrete element formed by pouring the concrete mix as claimed in claim 1 into a mold or formwork.

16. The structural concrete element as claimed in claim 15, wherein the structural concrete element is a floor slab, shell, retaining wall, foundation slab, raft, beam or column.

17. A ready mixed concrete comprising the concrete mix as claimed in claim 1.

* * * * *